US009239999B2

(12) United States Patent
Hawkins

(10) Patent No.: US 9,239,999 B2
(45) Date of Patent: Jan. 19, 2016

(54) SYSTEM AND METHOD FOR RANDOM VOICE COMMUNICATIONS THROUGH A SOCIAL NETWORK

(75) Inventor: Johnny D. Hawkins, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1349 days.

(21) Appl. No.: 12/103,261

(22) Filed: Apr. 15, 2008

(65) Prior Publication Data
US 2009/0259970 A1 Oct. 15, 2009

(51) Int. Cl.
*G06Q 10/10* (2012.01)
*H04M 3/56* (2006.01)
*H04L 29/06* (2006.01)
*H04L 29/08* (2006.01)

(52) U.S. Cl.
CPC ............ *G06Q 10/10* (2013.01); *H04L 65/1053* (2013.01); *H04L 65/1069* (2013.01); *H04L 67/306* (2013.01); *H04M 3/56* (2013.01); *H04L 65/403* (2013.01)

(58) Field of Classification Search
CPC ... G06F 3/002; G07F 17/324; G07F 17/3227; G07F 17/3267; G07F 17/3274; G07F 17/3288; G07F 17/3293; G06Q 50/01; G06Q 10/1095; H04L 51/10; H04L 51/04; H04L 65/403
USPC ......................................... 715/705, 706, 747
See application file for complete search history.

(56) References Cited

U.S. PATENT DOCUMENTS

| | | | |
|---|---|---|---|
| 6,425,012 B1 * | 7/2002 | Trovato et al. ................ 709/227 |
| 7,006,616 B1 * | 2/2006 | Christofferson .... H04L 12/1822 |
| | | | 379/202.01 |
| 7,478,414 B1 | 1/2009 | Glusker et al. |
| 7,634,790 B2 | 12/2009 | Finseth et al. |
| 7,788,695 B2 | 8/2010 | Walter et al. |
| 7,870,216 B2 | 1/2011 | Patron et al. |
| 7,890,638 B2 * | 2/2011 | Benco ................... G06Q 10/10 |
| | | | 709/227 |
| 2003/0005448 A1 | 1/2003 | Axelsson et al. |
| 2003/0078972 A1 | 4/2003 | Tapissier et al. |
| 2004/0194146 A1 | 9/2004 | Bates et al. |
| 2004/0231003 A1 | 11/2004 | Cooper et al. |
| 2005/0141542 A1 | 6/2005 | Handekyn et al. |
| 2005/0262542 A1 | 11/2005 | DeWeese et al. |
| 2006/0140169 A1 | 6/2006 | Soundararajan |
| 2006/0190966 A1 | 8/2006 | McKissick et al. |
| 2006/0271959 A1 | 11/2006 | Jacoby et al. |
| 2007/0169165 A1 | 7/2007 | Crull et al. |
| 2007/0198635 A1 * | 8/2007 | Lindner ............ G06F 17/30893 |
| | | | 709/203 |
| 2007/0268864 A1 * | 11/2007 | Mock et al. ................... 370/331 |
| 2008/0098313 A1 | 4/2008 | Pollack |
| 2008/0111699 A1 | 5/2008 | Kwon et al. |

(Continued)

OTHER PUBLICATIONS

Hansell, Saul, "Inaugurating Social TV", The New York Times, Jan. 20, 2009 (2 pages).

(Continued)

*Primary Examiner* — Sherrod Keaton
(74) *Attorney, Agent, or Firm* — Swanson & Bratschun, L.L.C.

(57) ABSTRACT

A system and method for establishing voice connections between users of a social network. User access is granted to a social network through a VoIP phone. The social network is navigated based on user input. The user is directly connected to a second user randomly for voice communications based on an authorization.

17 Claims, 7 Drawing Sheets

(56) References Cited

U.S. PATENT DOCUMENTS

| | | |
|---|---|---|
| 2008/0115164 A1 | 5/2008 | Kiiskinen |
| 2008/0168491 A1 | 7/2008 | Carlson et al. |
| 2008/0222295 A1* | 9/2008 | Robinson .......... G06F 17/30867 709/227 |
| 2008/0255977 A1* | 10/2008 | Altberg ............. G06F 17/30979 705/35 |
| 2009/0037470 A1* | 2/2009 | Schmidt ................ G06F 19/322 1/1 |
| 2009/0113480 A1 | 4/2009 | Allard et al. |
| 2009/0133070 A1 | 5/2009 | Hamano et al. |
| 2009/0268864 A1* | 10/2009 | Nishida .................. A61B 6/563 378/37 |
| 2009/0293079 A1 | 11/2009 | McKee et al. |
| 2010/0199340 A1 | 8/2010 | Jonas et al. |
| 2010/0319034 A1 | 12/2010 | Mountain |
| 2011/0067066 A1 | 3/2011 | Barton et al. |

OTHER PUBLICATIONS

TV Guide listings, Jul. 8, 2009, www.tvguide.com/Listings/default.aspx.

* cited by examiner

FIG. 7

Graphical User Interface    700

Connection Room    702   Username   JHawk
☑ Mountain Biking ▼ 706    704   Password   ********
  Book Club ▼ 708
  Investing ▼ 710
  Bored ▼ 712

Avatars in the Mountain Biking Connection Room
☐ LuckJ
☐ TripleS94
☐ Futurista!                                         714
☐ Hosermonkey
☐ Greenerthanu
☐ Vettsrus2012

☐ Random Connection 718
☑ Direct Connection 720
  ☑ Vettsrus2012

724   726
728   740
736   722
MTN Biking
716
734
730
738   732

742 Status: You have connected directly to Vettsrus2012 and are leaving the Mountain Biking Connection Room

SYSTEM AND METHOD FOR RANDOM VOICE COMMUNICATIONS THROUGH A SOCIAL NETWORK

BACKGROUND

Usage of the Internet has increased nearly exponentially in recent years to the point that the Internet is a part of many people's everyday lives. Further, the Internet has become an environment in which social networking occurs daily. Social networking is a network tool allowing a user to interact with other users who may have some common interests. Frequently, these interactions occur in computer chat, instant messaging, or email environments with users sending and receiving text and graphical messages.

While social networking sites and applications are increasing in popularity, these sites are limited by the types of communications and networking opportunities they allow. In other words, current social networking sites may limit the types of communications utilized by the different users and how users are introduced based on allowable interactions.

SUMMARY

One embodiment includes a system and method for establishing voice connections between users of a social network. User access may be granted to a social network through a voice over Internet Protocol (VoIP) phone. The social network may be navigated based on user input. The user may be directly connected to a second user randomly for voice communications based on an authorization.

Another embodiment includes a communications management system configured to manage voice communications through a social network. The system may include a connection coordinator configured to randomly connect a first user to a second user in response to a user request. The system may also include a user interface configured to display a graphical representation of connection rooms and avatars of other users. The user interface may display a menu for receiving user selections and allowing users to navigate the social network.

Yet another embodiment includes a communications management system for managing voice communications. The system may include a processor for executing a set of instructions and a memory for storing the set of instructions. The set of instructions may be configured to grant a user access to a social network through a VoIP phone, link the user to one of a number of connection rooms based on user input, the connection room including one, or more users carrying on voice communications, display a graphical representation of the connection room to the VoIP phone including an avatar for the one, or more users carrying on a voice communication in the connection room, and directly connect the user to a second user randomly based on an authorization.

BRIEF DESCRIPTION OF THE DRAWINGS

Illustrative embodiments of the present invention are described in detail below with reference to the attached drawing figures, which are incorporated by reference herein and wherein:

FIG. 7 is a pictorial representation of a graphical user interface (GUI) in accordance with an illustrative embodiment.

DETAILED DESCRIPTION OF THE DRAWINGS

Illustrative embodiments provide a system and method for random voice communications within a social network. Users may communicate randomly, directly, in a connection room dedicated for a particular purpose, or utilizing other systems and methods as herein described. The illustrative embodiments may be utilized to communicate through a specified connection room, directly to one or more other users/callers, or randomly with a user selected completely randomly or loosely based on the user's profile. In one embodiment, the random connection may be made based only on availability as granted by an authorization. Alternatively, the random connection may be completed based on an invitation/acceptance format. In yet another embodiment, the random connection may be made based on a point system with points assigned to different elements of a user's profile, such as age, sex, religion, political beliefs, occupation, marital status, interests, or other similar elements of the profile. The user may be matched based on similarities or dissimilarities.

Figure 1:
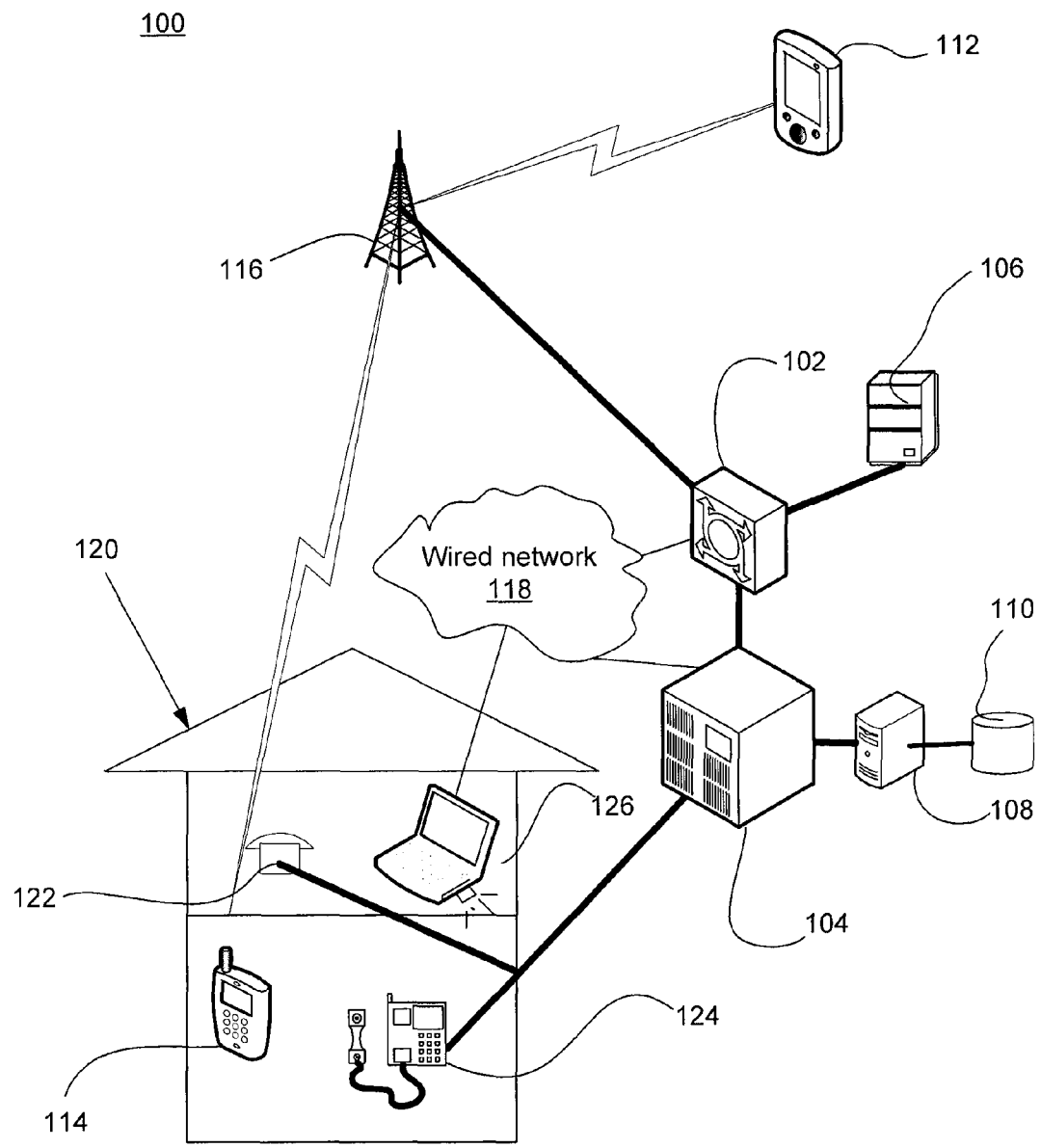
FIG. 1 is a pictorial representation of a communications environment in accordance with an illustrative embodiment.

FIG. 1 is a pictorial representation of a communications environment in accordance with an illustrative embodiment. The communication environment 100 of FIG. 1 includes various elements used for wireless and wired communications. The communications environment 100 includes a mobile switching center (MSC) 102, a local exchange 104, voicemail systems 106 and 108, a database 110, wireless devices 112 and 114, a transmission tower 116, a wired network 118, a home 120, home telephones 122 and 124, and a client 126. The different elements and components of the communications environment 100 may communicate using wireless communications including satellite connections and/or hard-wired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, one or more Blackberry®, personal digital assistances (PDA), mp3 players, laptops, evolution data optimized (EDO) cards, multi-mode devices, and other wireless communication devices and elements.

Communications within the communications environment 100 may occur on any number of networks which may include wireless networks, data, or packet networks, cable networks, satellite networks, private networks, publicly switched telephone networks (PSTN), the wired network 118, or other types of communication networks. The networks of the communications environment 100 may represent a single communication service provider, or multiple communications services providers. The features, services, and processes of the illustrative embodiments may be implemented by one or more elements of the communications environment 100 independently, or as a networked implementation.

In one embodiment, the MSC 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM, or PCS services to the wireless devices 112 and 114 located within the area the MSC 102 serves. The MSC 102 may include a home location register (HLR) and visitor location register (VLR) that may be used to implement different features of the illustrative embodiments. The voicemail system 106 may be an integrated part of the MSC 102, or alternatively may be an externally connected device.

In one embodiment, the voicemail system 106 may be replaced by a server or other intelligent network device for storing customer and usage information, call preferences, profiles, and data. The user may communicate, interact, or send and receive data, information, and commands to the server through the telephones 122 and 124, wireless device 112 and 114, or the client 126. The MSC 102 and voicemail system 106 may include any number of hardware and software components. In one embodiment, the MSC 106 is an advanced intelligence network device with software modules equipped to enable and implement call connections between one or more users of a social network.

The local exchange 104, the MSC 102, and/or other elements of the communications environment 100 may communicate using a signal control protocol, such as a signaling system number 7 (SS7) or TCP/IP protocols. The SS7 protocol, or similar protocols are used in publicly switched networks for establishing connections between switches, performing out-of-band signaling in support of the call-establishment, billing, routing, and implementing information-exchange functions of a publicly switched network, or the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include, or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch, or public exchange using time domain multiplexing to provide telecommunications services to a particular subscriber, or groups of subscribers. The local exchange 104 may be located at a local telephone company's central office, or at a business location serving as a private branch exchange. The local exchange 104 may provide dial-tone, calling features, and additional digital and data services to subscribers, such as home phones 122 and 124. The local exchange 104 may also enable VoIP communication of the home telephones 116 and 118 through a data network. VoIP works by sending voice information in digital form, such as packets, rather than using the traditional circuit-committed protocols of the publicly switched network. The local exchange 104 may be, or include a feature server, a call control agent, or an IP gateway for implementing VoIP communications. The phones 122 and 124 may enable navigation of a social network site stored in, connected to, or accessible by the elements or devices of the communications environment 100.

The communications environment 100 may further include any number of hardware and software elements that may not be shown in the example of FIG. 1. For example, in order to facilitate VoIP communications, the communications system and the MSC 102 and the local exchange 104, in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104, or other components of a wire line network, such as data, PSTN, VoIP, or other wired network may implement the features and perform the methods herein described.

The MSC 102 and the local exchange 104 may include an authentication space. The authentication space may be a partition, module, or other storage, or memory of the server designated by the communications service provider. The authentication space may validate that a user or device, such as client 126, is allowed to authorize the social network site, MSC 102, local exchange 104, or corresponding voicemail systems 106 and 108 to set preferences, implement changes, review information, or perform other updates. For example, a user may be first required to provide a secure identifier, such as a user name, password, or other authentication code, or hardware interface, to verify the user is authorized to make changes within the authentication space.

The authentication information may be used to create a secure connection between the client and the MSC 102 or the local exchange 104. The secure connection may be a virtual private network tunnel, an encrypted connection, firewall, or other form of secured communications link. The secure connection may be used to send and receive voice communications between one or more users ensuring that caller identification information or other data is not exchanged at all or only without the explicit permission of the user for ensuring the privacy and security of users. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network, or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one, or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices, or may be used in different forms. For example, the home telephone 122 may be part of a refrigerator or intercom system. In another embodiment, the home telephone 124 may be integrated with a personal computer, such as client 126.

The communications services accessible from the home telephones 122 and 124 may include standard telephone service, or VoIP telephone service. The home telephones 122 and 124 may be VoIP telephones, or may be standard telephones that include a modem and/or VoIP adapters for enabling VoIP communications. A special dial tone, message, web alert, or other feedback may specify once or repeatedly that the home telephones 116 and 118 are implementing a particular feature. For example, the home telephones 116 and 118 may sound a double chirp when enabled to communicate through or navigate the social networking site. The user may cancel use of any features by re-entering the feature command or a cancellation command.

The client 126 may be a personal computer for performing and executing programs and instructions and accessing the wired network 118. However, the client 126 may be any computing devices suitable for communicating with the wired network 118 through a network connection. The wired network 118 may be a fiber optic, cable, or telephone network, or other wired network suitable for communication over a hard wired connection with the client 126. In one embodiment, the home 120 may include a wireless router, adapter, switch, hub, or other suitable interface that allows the client 126 to communicate with the wired network 118. Alternatively, the client 126 may communicate with the wired network 118 through a wireless connection. The MSC 102 and local exchange 104 may use a GUI available through a website or program accessible from the client 126 in order to enter and receive input preferences for communicating through the social network. The client 126 may also include software and hardware for enabling a soft phone. A soft phone is a software program for making telephone calls over the Internet or network connection using a general purpose computer rather than using dedicated voice communications hardware.

In an illustrative embodiment, the user may provide user input, dial a user, select a connection room, enable a random connection, or otherwise, make selections and communicate commands using devices, such as, or similar to, wireless devices 112 and 114, home telephones 122 and 124, and client 126. At any time, a user may select to enable, order, initiate, configure, reconfigure, or otherwise communicate through a social network.

At any time, a user may select to enable, order, initiate, implement, or otherwise perform the features herein described. For example, the user may use a command that informs a function trigger of a device, or the device itself, such as the MSC 102, local exchange 104, voicemail systems 105 and 106, wireless device 112 and 114, home telephones 122 and 124, or client 126, to randomly connect to another caller available and willing to carry on a voice conversation. In one example, the user may submit a command to activate the random connection by dialing *2 on the home telephone 122 and then entering a pass code, account code, password, pin number, or other identifier. In another embodiment, a user may enter a connection room using a pre-set preference by dialing *79 on a separate wireless device. The command may also be a password, voice activated, time activated, preset by user selection, or any other suitable option, setting, command, or user input. In another embodiment, the various features may be implemented using tactile commands.

Figure 2:
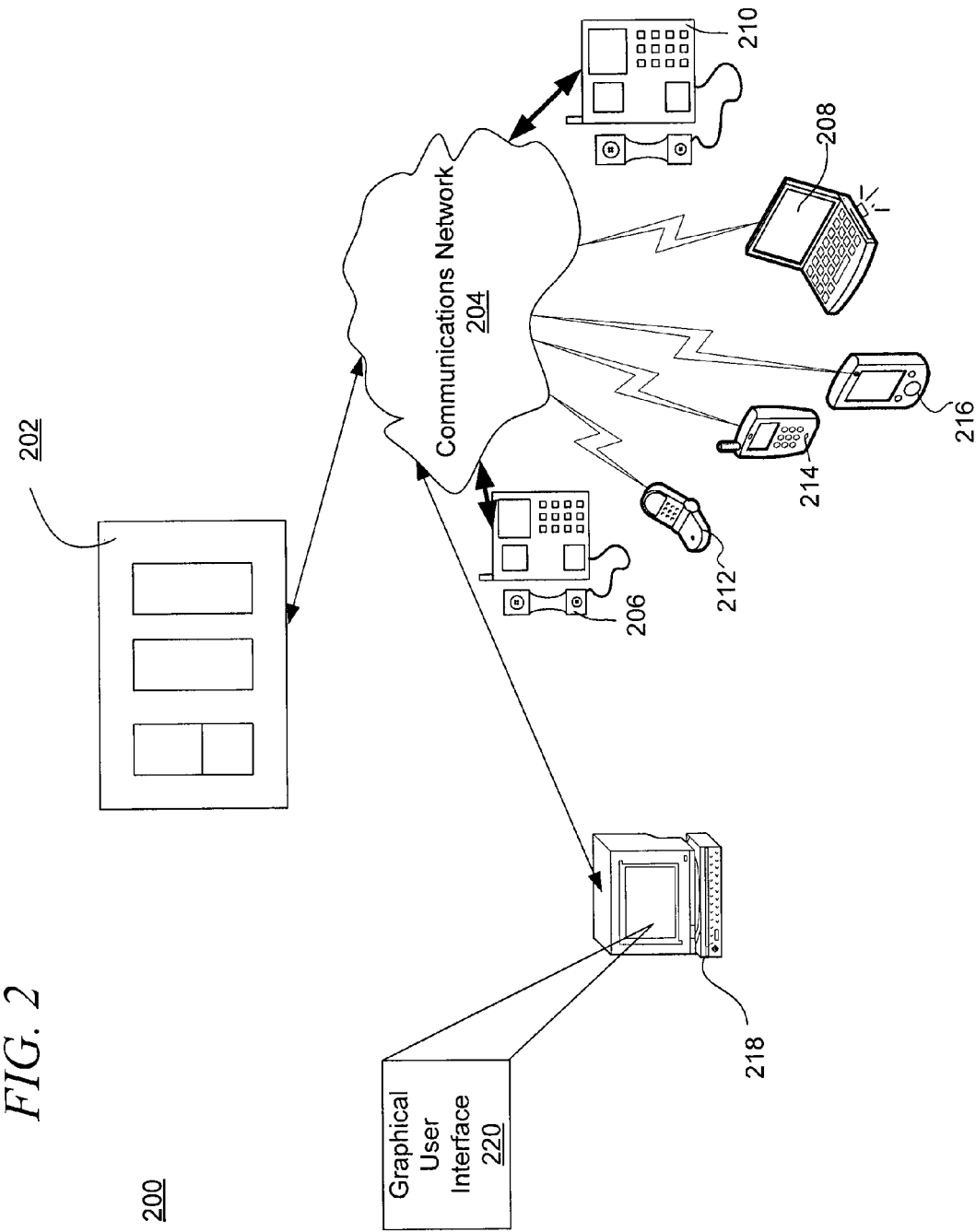
FIG. 2 is a pictorial representation of a communications system in accordance with an illustrative embodiment.

FIG. 2 is a pictorial representation of a communications system in accordance with an illustrative embodiment. The communications system 200 is a particular implementation of aspects of the communications environment 100 of FIG. 1. The communications system 200 may include numerous devices including, but not limited to, a communications management system 202, a communications network 204, VoIP phones 206, 208, and 210, wireless devices 212, 214, and 216, client 218, and GUI 220.

The communications management system 202 is one or more devices utilized to enable, initiate, route, and manage communications between one or more telephonic devices. The communications management system 202 may include one or more devices networked to manage the communications network 204. For example, the communications management system may include any number of servers, routers, switches, or advanced intelligent devices. The communications network 204 sends and receives the electronic signals through any number of transmission mediums. The communications network 204 may include various fiber optics, cables, transmission towers, antennas, or other elements for transmitting voice communications to the connected telephonic devices. In a preferred embodiment, the communications management system 202 and the communications network 204 work to transmit voice communications to the VoIP phones 206, 208, and 210. However, the communications system 200 may enable plain old telephone service (POTS), wireless service, or other forms of voice communications. As a result, the wireless devices 212, 214 and 216 may be enabled through the communications network 204, as well as any number of POTS phones or other similar telephonic devices.

Communications between the telephonic devices illustrated in the communications system 200 may occur through the communications network 204 and the communications management system 202 as a mediator or intermediary device. For example, all communications may be routed through the communication management system 202 regardless of location. Alternatively, based on a user selection in a social network that may be encompassed, controlled, or otherwise managed by the communications management system 202, a communication may be routed directly between devices through the communications network 204 or other interconnected communications networks.

For example, the users accessing the VoIP phones 206 and 210 may be carrying on voice communications in a connection room provided by the communications management system 202. In one embodiment, a user accessing the same connection room utilizing the VoIP phone 208 may be distracting the other users from being able to effectively carry on their conversation. As a result, a first user may provide input through the VoIP phone 206 to invite a second user utilizing the VoIP phone 210 to carry on a direct conversation. In response to the second user accepting the invitation, the communication of the VoIP phones 206 and 210 occurring through the connection room 202 is terminated and instead, the VoIP phones 206 and 210 communicate directly through the communications network 204.

In one embodiment, the communications management system 202 or social networking element of the communications management system 202 is removed from the routing path so that the communications occur directly between the VoIP phones 206 and 210. Despite the direct connection, caller ID information may not be exchanged at all, unless exchanged verbally, textually, or explicitly agreed to by the users.

In another embodiment, even when a direct connection is randomly or selectively initiated between a user and one or more other parties, the social networking interfaces, commands, graphics, protections, or other elements remain in place. These procedures may ensure that applicable laws and safeguards are allowed to function to protect the users.

The communications management system 202 may additionally manage communications for a social network. The social network, or other features of a social network, may be implemented by the communications management system 202 and the communications network 204. Alternatively, the communications management system 202 may manage voice communications for a social network that is run utilizing separate servers or communications networks. In particular, the communications management system 202 may allow users utilizing the social network to carry on voice communications or conversations through connection rooms. The connection rooms are a call bridge enabling any number of users to simultaneously communicate. The users within the connection room may be automatically linked to the connection room based on user profiles, preferences, or past histories. Alternatively, the users may be randomly assigned to a connection room based on a selection or other criteria.

As previously described, the communications management system 202 may allow any number of users to carry on direct communications by bypassing a connection room, or other social networking devices, or applications of the communications management system 202. For example, based on a user invitation or other mutual acceptance, the VoIP phones 206 and 208 and wireless phones 214 may be directly connected through the communications network 204 without interaction with a social networking aspect of the communications management system 202, or communications network 204.

The client 218 is a computing device communicating with the communications network 204 and/or the communications management system 202 through a network connection. In one embodiment, the client 218 is a laptop, personal digital assistant PDA, blackberry, or other similar computing device. The users accessing any of the telephonic devices of the communications system 200 may utilize the respective telephonic devices, such as, VoIP phone 206, to configure, modify, or enable a user profile available through the social network provided by the communications management system 202. However, the user may also use the client 218 and, more particularly, the GUI 220 to configure the user profile.

The GUI 220 is an interfacing element for displaying information from the social network and receiving user input. For example, the user may utilize the GUI 220 to select an avatar utilized by the user in the social network. The GUI 220 may be an application, touch screen, or other interactive element for interacting with a user.

Figure 3:
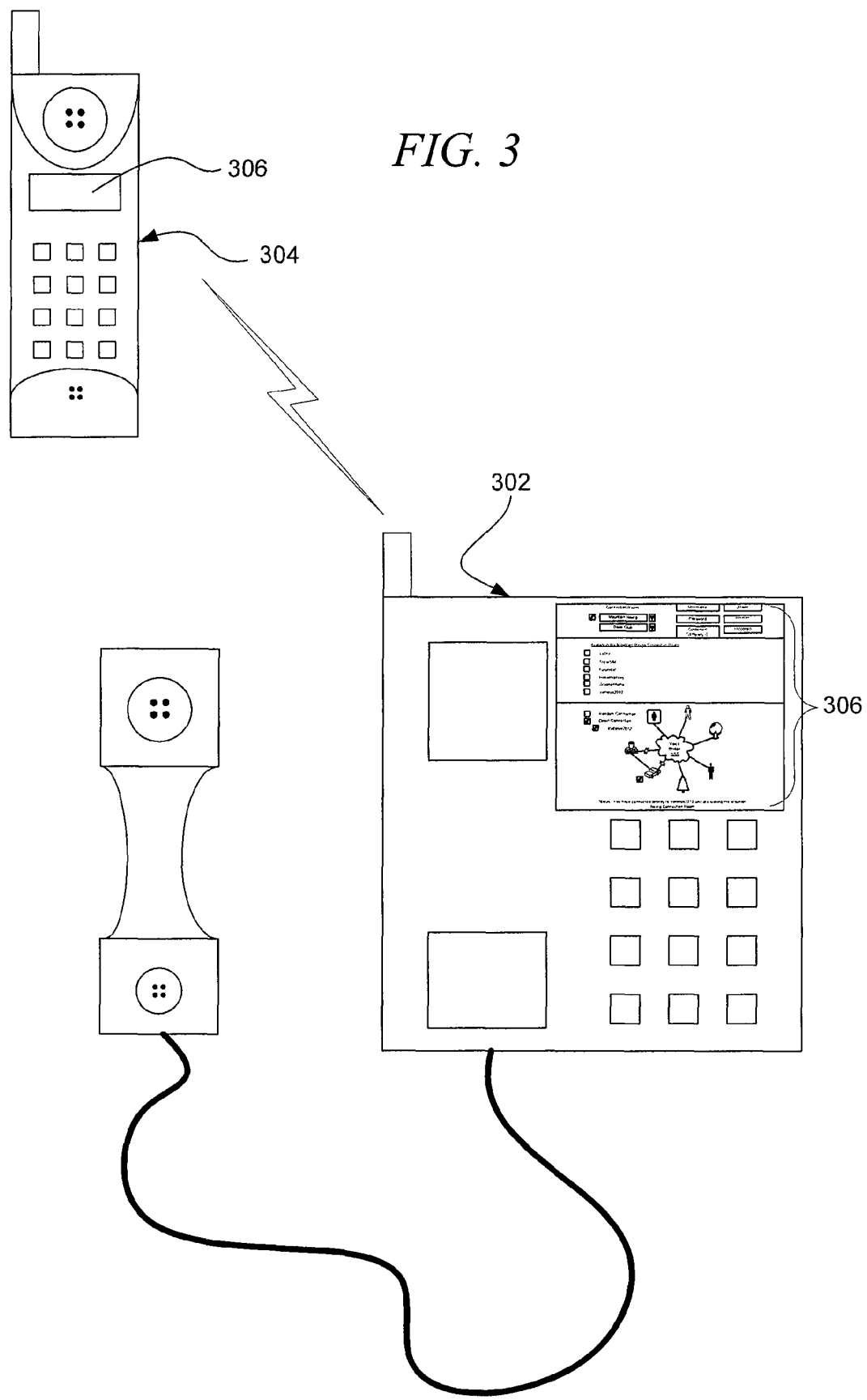
FIG. 3 is a pictorial representation of a VoIP telephone in accordance with an illustrative embodiment.

FIG. 3 is a pictorial representation of a VoIP telephone in accordance with an illustrative embodiment. The VoIP phone 302 is a particular implementation of at least the VoIP phone 206 of FIG. 2. The VoIP phone 302 may include a handset 304 and a display 306.

In one embodiment, the VoIP phone 302 may be utilized to navigate and communicate through a social network. In another embodiment, the VoIP phone 302 may be used in conjunction with a traditional computing device, such as a personal computer or laptop, in order to carry on voice communications over a social network. For example, the VoIP phone 302 may be linked with a client or computing device enabling the user to manage and coordinate voice communications through the VoIP phone 302 while simultaneously using the client to navigate, type and perform other tasks traditionally associated with utilizing the social network. The user may utilize the VoIP phone 302 to dial another user, or mute the line. However, the user may also use the client device to select an alternative connection room.

The user may employ the VoIP phone 302 or the handset 304 to carry on voice communications, or provide user input as herein described. In particular, the VoIP phone 302 and the handset 304 may include a display. The display 366 may be a touch screen, LCD monitor, or other element suitable for displaying information to the user. Similarly, the display 306 may allow the user to provide user input. For example, the display 306 may be a touch screen that allows a user to select an avatar, connect to a specified individual, end a call, or transfer to a different connection room.

As previously described, the display 306 may present a graphical representation of the voice communications that are occurring within the VoIP phone handset 304 and/or a client device. In one embodiment, the user may navigate the social network entirely using the VoIP phone 302. The VoIP phone 302 may include any number of buttons, shortcut keys, indicators, or other interactive elements for interfacing with the user, both audibly, visually and tactilely.

Figure 4:
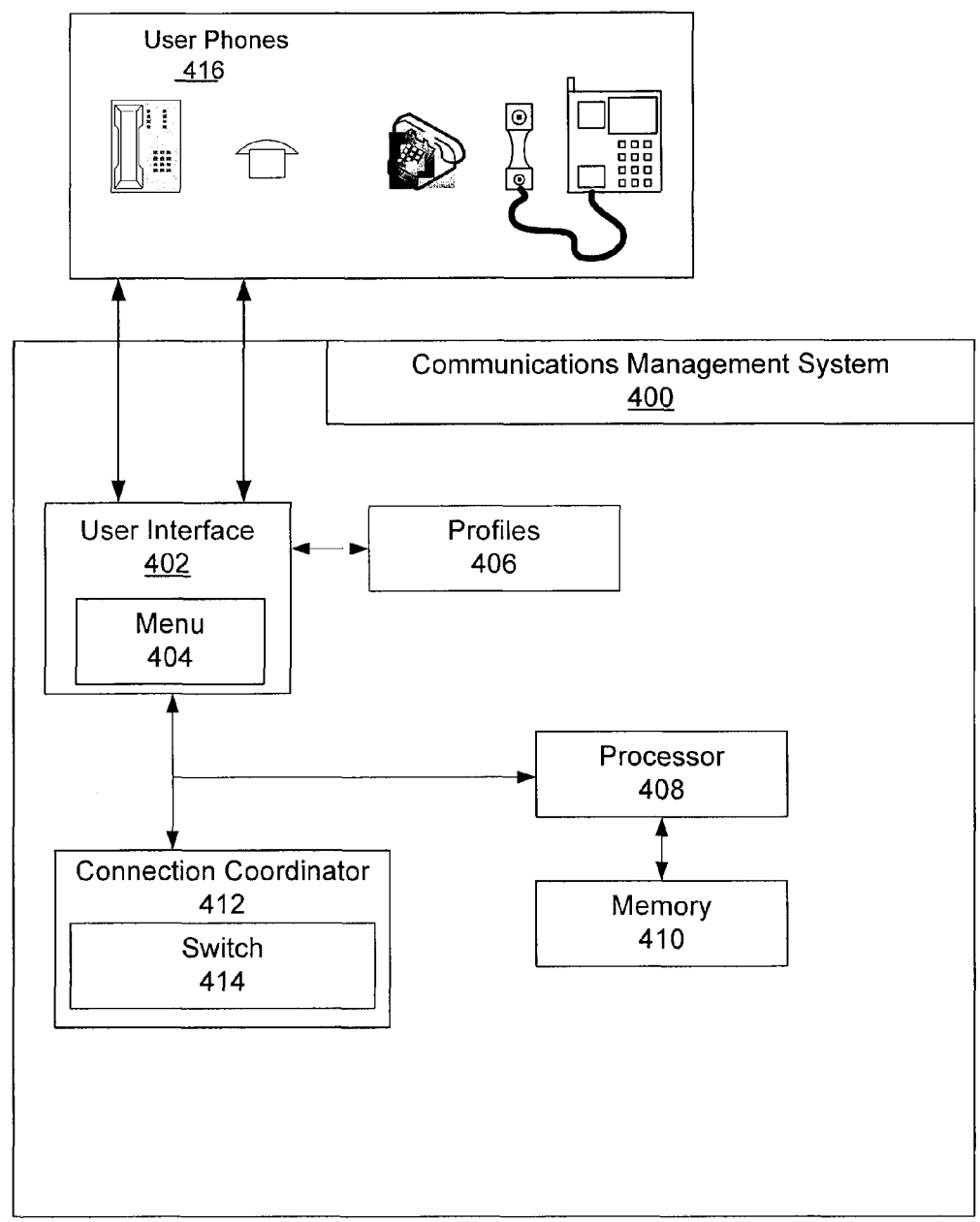
FIG. 4 is a block diagram of a communications management system in accordance with an illustrative embodiment.

FIG. 4 is a block diagram of a communications management system in accordance with an illustrative embodiment. The communications management system 400 is a particular implementation of the communications management system 202 of FIG. 2. The communications management system 400 may include a user interface 402, a menu 404, a profile 406, a processor 408, a memory 410, a connection coordinator 412, and a switch 414. The communications management system 400 may communicate with user phones 416.

The processor 408 is circuitry or logic enabled to control the execution of a set of instructions. The processor 408 may be a microprocessor, digital signal processor, central processing unit, or other device suitable for controlling an electronic device, including one or more hardware and software elements, executing software, instructions, programs and applications, converting and processing signals and information, and performing other related tasks. The processor 408 may be a single chip, or integrated with other computing or communications elements.

The memory 410 is a hardware element, device, or recording media configured to store data for subsequent retrieval or access at a later time. The memory 410 may be static or dynamic memory. The memory 410 may include a hard disk, random access memory, cache, removable media drive, mass storage, or configuration suitable as storage for data, instructions, and information. In one embodiment, the memory 410 and processor 302 may be integrated. The memory may use any type of volatile or non-volatile storage techniques and mediums.

The user phones 416 are the telephonic devices utilized by the one or more users to communicate with the communications management system 400 and amongst themselves or other external users. The user phones 416 may include VoIP, POTS, soft, wireless, or other telephones enabling voice communications.

As previously described, the user phones 416 may work in conjunction with any number of client devices allowing the user to navigate the social network and carry on related communications. The communications management system 400 may be a server, switch, or other device that enables social networking. In particular, the different elements of the communications management system 400 include the user interface 402, the menu 404, the profiles 406, the connection coordinator 412 and the switch 414 and may be part of a social networking application. The social networking application may be stored in the memory 410, implemented in logic or firmware, or otherwise executed by the processor 408.

In another embodiment, the different elements of the communications management system 400 may be individual modules executed to perform the features herein described, or the individual elements may similarly be embodied in hardware elements which may include cards, switches, busses, interfaces, converters, or other similar computers and communications elements.

The user interface 402 is an interface enabling interaction between the user phones 416 and the communications management system 400. In one embodiment, the user interface 402 may display a GUI to the user phones 416. The GUI may present the menu 404 enabling the user accessing the user phones 416 to navigate the social network. In particular, through the menu 404, the users may add, configure, or otherwise modify the profiles 406.

The profiles 406 are the interests and personal information of the users. The profiles 406 may store user selected personal information and preferences. In one embodiment, each user may associate a customizable personage, picture, symbol, graphic, text, or other element known as an avatar with his or her profile. For example, a user may present a picture of a fish or a car as an avatar each time the user enters a connection room, or otherwise, communicates through the social network.

The profiles 406 may also store information regarding preferred connection rooms. In one embodiment, the user may set a default connection room that the user is automatically bridged or linked to when the user dials, or accesses the social network through the communications management system 400. The profiles 406 may also set preferences that configure how and when the communications management system 400 may manually, automatically, or randomly connect a user to one or more users directly or through a connection room. For example, the user may select to randomly connect to a user based only on an authorization or selection. Alternatively, the user may select to randomly connect to another user by sending or receiving an invitation for a random conversation. The menu 404 may also allow the user to specify how and when actions are automatically or selectively performed on behalf of the user.

The connection coordinator 412 is the circuitry and components that allow any number of users from the user phones 416 to communicate with one another. In particular, the connection coordinator 412 includes the switch 414. The switch 414 is a device for switching calls between one, or more connection rooms or otherwise rerouting a call. The connection coordinator 412 may bridge any number of users in a connection room. The connection coordinator 412 may bridge the users based on a manual selection or based on logic. For example, the connection coordinator 412 may use logic to determine that a number of users interested in personal finance should be bridged together based on pre-selected criteria. Also for example, the pre-selected criteria may include availability or network status. For example, each of the users may have established that if one or more of the other users is active or logged on to the social network through the communications management system 400, the connection coordinator 412 is to send them a message and then automatically connect them together. Similarly, individual users may set criteria, preferences, or other logic that connects one or more family members together in a voice call based on a user selected status, such as "available". Similar logic, criteria, parameters, or preferences may be used to initiate a random connection for voice communication with one or more other users. The switch 414 controls connection of one or more users based on the command from the connection coordinator 412.

Figure 5:
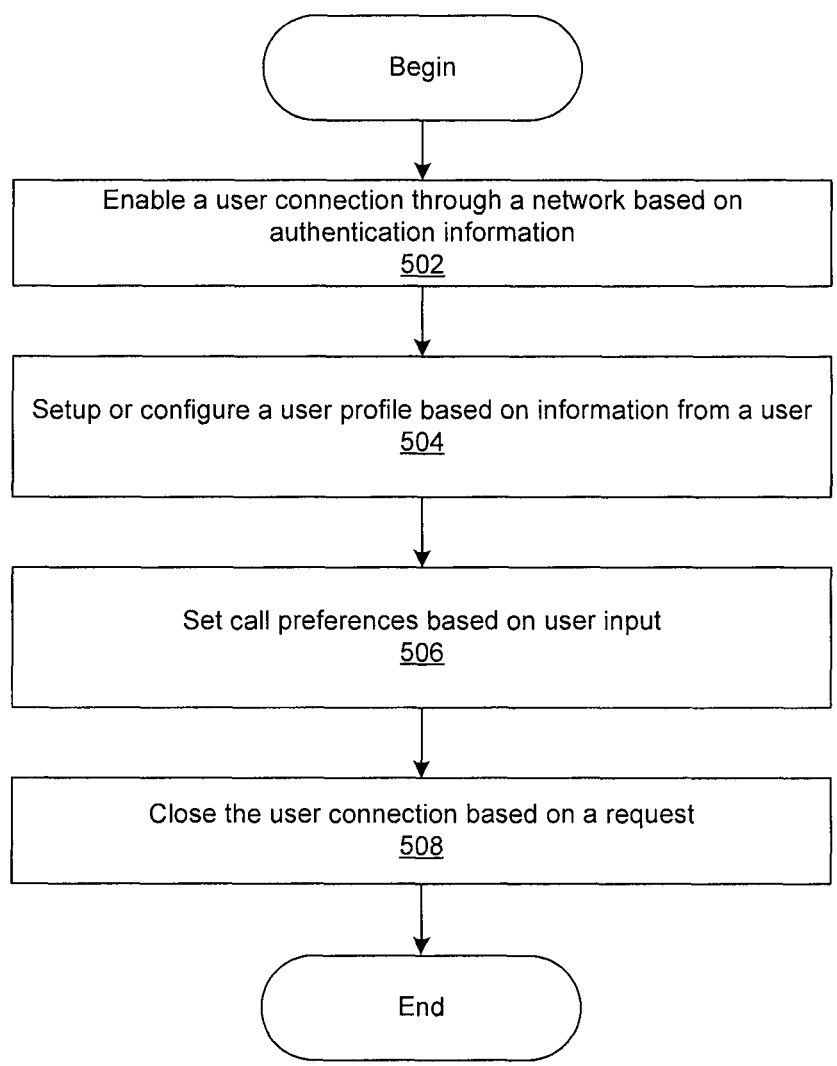
FIG. 5 is a flowchart of a process for establishing a user profile for call connections in a social network in accordance with an illustrative embodiment.

FIG. 5 is a flowchart of a process for establishing a user profile for call connections in a social network in accordance with an illustrative embodiment. The process of FIG. 5 may be implemented by a communications management system or a social networking server. The process may begin by enabling a user connection through a network based on authentication information (step 502). The user connection may occur through any number of devices. In one embodiment, the user connection is enabled through a VoIP phone. The authentication information may include a user name, password, IP address, MAC address, or other specified information or device identifier. Once the user has successfully logged on or accessed the communications management system one time, a cookie, or other smart identification element may allow the user to access the communications management system without being required to constantly provide the authentication information.

Next, the communications management system sets up or configures a user profile based on information from a user (step 504). The communications management system may provide prompts, questions, selections, or other interfacing elements for receiving the user input in step 504. For example, the user may be presented with any number of check boxes that may be selected to indicate the user's interests in such things as sports, games, movies, entertainment, politics, religion, or any other topic that may be selected, or manually entered.

Next, the communications management system sets call preferences based on user input (step 506). The call preferences may specify how and when the user is to be connected to other users as part of the user's profile. For example, the connection preferences may specify preferred connection rooms that the user is to be automatically linked to. The connection preferences may also specify a criteria for when or how the user is linked to one or more users randomly or based on a selection. For example, the user may specify that she would like to be linked to a call regarding religion once a threshold of three users enters the specified connection room. The connection preferences may also indicate the types of connection the user is willing to participate in under all or any circumstances. In addition, the user profile may include any number of information, interests, or criteria commonly used by social networking sites.

Figure 6:
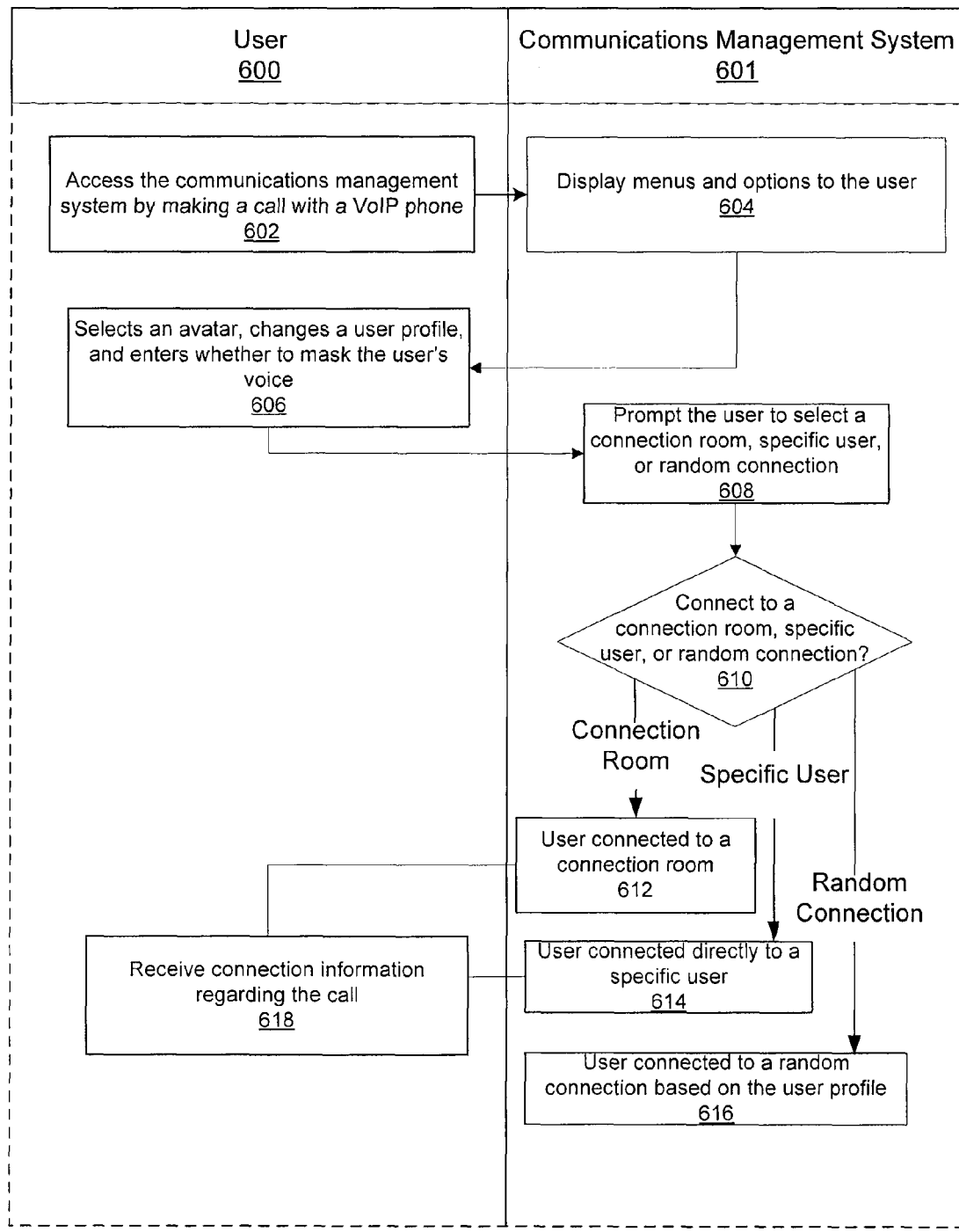
FIG. 6 is a flowchart of a process for establishing call connections in a social network in accordance with an illustrative embodiment.

The process terminates with the communications management system closing the user connection based on the user's request (step 508). FIG. 6 is a flowchart of a process for establishing call connections in a social network in accordance with an illustrative embodiment. The process of FIG. 6 may be implemented by a user 600 and a communications management system 601. The user 600 represents an individual accessing a communications enabled device, such as a VoIP or wireless phone.

The process begins with the user 600 accessing the communications management system 601 by making a call with a VoIP phone (step 602). The user 600 may access the communications management system 601 by dialing a designated phone number, such as a 1-800 number, or by making a selection through the VoIP phone. The communications management system 601 displays menus and options to the user (step 604). The menus and options of step 604 may be configured to allow the user to navigate the social network. In one embodiment, the menus and options may provide the user with various options for carrying on voice communications with one or more other users.

Next, the user 600 selects an avatar, changes a user profile, and enters whether to mask the user's voice (step 606). The user input and selections provided by the user 600 may be made through the VoIP phone. In another embodiment, the user may navigate using voice commands. For example, the communications management system 601 may include an interactive voice response (IVR) system enabling the user to navigate the social networking site through voice commands, text messages, or other input.

The communications management system 601 prompts the user to select a connection room, specific user, or random connection (step 608). The prompt may be always available or presented to the user only in designated portions of the social network site.

Next, the communications management system 601 determines whether to connect to a connection room, specific user, or random connection (step 610). The determination of step 610 may be made based on a manual user selection, the user's profile, or other information or criteria. For example, the user may have made a selection in step 606 that provides specific input to the communication management system 601. If the communications management system 601 determines to connect to a connection room, the user is connected to a connection room (step 612). If the communications management system 601 determines to connect to a specific user in step 610, the user is connected directly to a specific user (step 614), and alternatively, if the communications management system 601 determines to connect randomly in step 610, the user is connected to a random connection based on the user profile (step 616).

After a connection is made in any of steps 612, 614, or 616, the user receives connection information regarding the call (step 618). The connection information displayed during step 618 may depend on the type of connection specified. The connection information may show an avatar of the one or more users the user 600 is communicating with. The connection information may also display a user name, an indicator specifying which of the one or more users is communicating, and a summary of the user's profile.

The user is connected to a connection room in step 612 in order to carry on a group conversation. Group conversations are particularly enjoyable because of the many opinions and interactions that the user 600 may experience. For a more focused conversation, the user 600 may select to communicate directly with one or more other users. During step 614, the communications management system 601 may separate the call from social networking aspects of the communication. For example, the call may or may not be completely disconnected from the social networking environment in order to allow the user 600 to carry on a more effective conversation.

In another embodiment, the call may be directly connected to another user to allow for more privacy during a one-on-one conversation while still benefiting from the menu options and other settings of the social networking site provided by the communications management system 601.

In step 616, the user may select to be connected to a random connection, caller, or user based on a user profile. For example, the user may wish to speak to someone interested in art without knowing beforehand who he or she will be talking with. By selecting to be randomly connected, the user may be more surprised and feel that using the social networking site is more adventurous and enlightening because of the different options presented. In one embodiment, a first user and a second user may be connected randomly. In another embodiment, a minimum authorization may be required to indicate the user's willingness and availability to participate in a random conversation. For example, a user may set a status indicator specifying willingness to participate in a random conversation, subsequent the user may be connected at random to another user. In another embodiment, information including a generalized topic may be utilized to randomly connect to another user. The random connections may also be generated based on an invitation/acceptance format from a first user to a second user. A group size may also be specified for randomly connecting a user to other users. In one embodiment, the user may be able to specify parameters or criteria for connecting, such as spoken language, region, time availability, or topic.

The communications management system 601 may provide any number of selections, indicators, or safeguards for protecting the privacy and security of each user. For example, at any time, the user 600 may report abuse of the system or may block a user from further communicating with them. Additionally, the user 600 may report inappropriate behavior language or other information to an administrator of the communications management system 601. The user may also be randomly connected based on a point basis for similarities or difference. Points may be calculated for each parameter specified in the user's profile, such as age, sex, marital status, interest in defined categories, or other criteria. The user may select to randomly speak with users with similar interests based on a higher number of shared points. Similarly, the user may select to connect to a user with the largest difference in points to get a different point of view.

During steps 612, 614 and 616, no caller identification information is exchanged other than that is displayed by default or as selected by the user. For example, during a typical call only a user name and avatar, if selected, may be displayed to another user.

FIG. 7 is a pictorial representation of a GUI in accordance with an illustrative embodiment. The GUI 700 is a particular representation of a the GUI 220 of FIG. 2. The GUI 700 may include various interactive and display elements, including, but not limited to, a username 702, a password, 704, connection rooms 706, 708, 710, 712, a user list 714, a connection room graphic 716, a random connection indicator 718, a direct connection indicator 720, a user avatar 722, avatars 724, 726, 728, 730, 732, 734, speaking indicators 736, 738, 740, and a status indicator 742.

The GUI 700 displays various elements and indicators that may be part of one or more menus available through the social network. In particular, the GUI 700 may be displayed through a VoIP phone enabling the user to navigate and control voice communications that occur through the social network.

The user name 702 and password 704 may allow the user to securely log on to the social network site or communications management device. Alternatively, the user name 702 and password 704 may be replaced by another authentication code, hardware address, device number, or dongle. The user name 702 may be the name utilized by the user as a pseudo name, nickname, or profile indicator, while utilizing the social network.

The connection rooms 706, 708, 710 and 712 allow a user to selectively enter a specified connection room. For example, as shown, the user may select to enter a room associated with mountain biking. In addition, there may be any number of rooms associated with a given topic or name. The mountain biking connection room 706 may include any number of sub-rooms that are separated based on region, type of trails, racing, or other relevant information.

The user may alternatively select to enter the investing or bored connection room by selecting connection rooms 710 or 712. In one embodiment, connection room 712 may represent a room utilized randomly by users to connect and talk about whatever subject or for whatever purpose.

The user list 714 is a list of users connected to a specified connection room or that are communicating with the user. The user list 714 expands or contracts based on users leaving the room or otherwise disconnecting from the connection room.

The connection room graphics 716 is a graphical representation of the users communicating in the specified connection room. The connection room graphics 716 may be configured or displayed in any number of logical, graphical, or textual patterns that are statically or dynamically displayed. In one embodiment, the connection room graphics 716 may be a list of users within the connection room. In another embodiment, connection room graphics 716 may simply display the different avatars with the corresponding user name.

The user avatar 722 represents the user accessing and controlling the GUI 700. The avatars 724, 726, 728, 730, 732 and 734 represent the avatars or users communicating within the specified connection room. As previously described, any number of avatars may be displayed, added, or removed as the connection room naturally expands and contracts.

Speaking indicators 736, 738, and 740 are displayed when a specified user or avatar is speaking. For example, as shown in the GUI 700, avatar 722, 724, and 728 are speaking and therefore have speaking indicators 736, 738, and 740 displayed, respectively. The speaking indicators 736, 738, and 740 may be displayed in order to allow the user to associate a voice with the comments being made. Similarly, the speaking indicators 736, 738, and 740 provides an enhanced way of determining whether to carry on a more personal conversation with a user based on their comments. The speaking indicators 736, 738, and 740 may also allow the user to direct comments or questions directly to a specified avatar based on the ongoing conversation In another embodiment, a voice to text program may translate one or more user words and visually display them as if the avatar were speaking. Each avatar may also be moved to a different part of a display based on the frequency with which they have talked or the amplitude of their voice.

The status indicator 742 indicates the status of the user. For example, the user may have just selected to connect directly to another user and as a result, will be leaving a specified connection room.

The random connection indicator 718 and the direct connection indicator 720 may allow a user to leave the mountain biking connection room 706 in order to carry on a direct connection with the avatar 734. At any time the user may select to carry on a direct conversation with one, or more selected avatars. Alternatively, the user may use the random connection indicator 718 to randomly connect to any number of users that are similarly seeking to randomly speak with another user, or are willing to accept an invitation to speak with another user.

The random connection indicator 718 may be activated at any time and may be controlled by criteria or parameters previously established by the user. For example, the user may have selected to speak only with other female avatars when randomly connecting.

The previous detailed description is of a small number of embodiments for implementing the invention and is not intended to be limiting in scope. The following claims set forth a number of the embodiments of the invention disclosed with greater particularity.

What is claimed:

1. A method for establishing voice connections between users of a social network, the method comprising:
   authenticating a first user and a second user to access the social network;
   establishing, in response to authenticating the first and second users, a secure connection to a communications management system over a communications network, wherein the secure connection prevents caller identification information from being exchanged with other users on the social network;
   granting the first and second users access to the social network, via the communications management system, wherein the first and second users access the social network through their respective VoIP phones, wherein the social network includes a plurality of users connected to the communications management system, and wherein the first and second users each establish a respective user profile on the social network, wherein the respective user profile includes at least one criterion for establishing random one-on-one voice communications;
   receiving, via the communications management system, authorization to engage in random one-on-one voice communications from the first and second users;
   receiving a request to engage in random one-on-one voice communications from at least one of the first and second users;
   masking the voice of the first or the second user in response to user input received from the first or the second user;
   directly connecting, in response to receiving the request at the communications management system, the first user to the second user randomly for one-on-one voice communications, wherein:
      the first user is randomly matched, by the communications management system, to the second user based on their respective user profiles,
      the first user does not select the second user, and
      the communications management system is removed from the routing path between the respective VoIP phones of the first and second users and a direct connection is established over the communications network; and
   withholding caller identification information of the first user from the second user while directly connected.

2. The method according to claim 1, further comprising:
   linking the first user to one of a plurality of connection rooms based on user input, the connection room including one or more users simultaneously carrying on voice communications; and
   displaying a graphical representation of the connection room to the VoIP phone including an avatar for the one or more users carrying on a voice communication in the connection room.

3. The method according to claim 2, wherein the linking is performed in response to the user profile of the first user.

4. The method according to claim 2, further comprising:
   highlighting the avatars of the one or more users when the one or more users is speaking.

5. The method according to claim 1, wherein the first user is directly connected to the second user in response to the second user accepting an invitation from the first user.

6. The method according to claim 2, wherein the connection room is established utilizing a call bridge.

7. The method according to claim 2, further comprising:
   preventing caller identification information from being viewed in the connection.

8. The method according to claim 1, wherein the respective user profiles further specify at least one of preferred connection rooms, interests, user information, topic of conversation, region, and language.

9. The method according to claim 1, further comprising: integrating the connection rooms with an existing social network.

10. A system for managing voice communications through a social network, the system comprising:
- a communications network;
- a first VoIP phone associated with a first user, the first VoIP phone connected to the communications network;
- a second VoIP phone associated with a second user, the second VoIP phone connected to the communications network;
- a communications management system accessible over the communications network, the communications management system comprising:
  - a processor for executing a set of instructions;
  - a memory for storing the set of instructions, wherein the set of instructions include instructions to:
    - authenticate the first and second users to access the social network;
    - establish, in response to the authentication, a secure connection to the first and second VoIP phones, wherein the secure connection prevents caller identification information from being exchanged with other users on the social network;
    - grant the first and second users access to the social network, wherein the first and second users access the social network through the first and second VoIP phones respectively, wherein the social network includes a plurality of users, and wherein the first and second users each establish a respective user profile on the social network, wherein the respective user profile includes at least one criterion for establishing random one-on-one voice communications;
    - receive, from the first and second users, authorization to engage in random one-on-one voice communications;
    - receive a request to engage in random one-on-one voice communications from at least one of the first and second users;
    - mask the voice of the first or the second user in response to user input received from the first or the second user;
    - directly connect, in response to receiving the request, the first user to the second user randomly for one-on-one voice communications, wherein:
      - the first user is randomly matched to the second user based on their respective user profiles,
      - the first user does not select the second user, and
      - the communications management system is removed from the routing path between the first and second VoIP phones and a direct connection is established over the communications network between the first and second VoIP phones; and
    - withhold caller identification information of the first user from the second user while the first and second users are directly connected.

11. The system according to claim 10, wherein the set of instructions further includes instructions to link the first user to one of a plurality of connection rooms based on the first user's respective user profile.

12. The system according to claim 10, wherein the at least one criterion includes one or more of a topic of conversation, interests, region, language, or user information.

13. The system according to claim 10, wherein the set of instructions further includes instructions to prevent caller identification information from being viewed in the connection room.

14. An apparatus for managing voice communications comprising:
- a processor for executing a set of instructions; and
- a memory for storing the set of instructions, wherein the set of instructions includes instructions to:
  - authenticate, over a communications network, a first user and a second user to access a social network;
  - establish, in response to the authentication, a secure connection to a first VoIP phone associated with the first user and a second VoIP phone associated with the second user over the communications network, wherein the secure connection prevents caller identification information from being exchanged with other users on the social network;
  - grant the first and second users access to the social network, wherein the first and second users access the social network through the first and second VoIP phones respectively, wherein the social network includes a plurality of users, and wherein the first and second users each establish a respective user profile on the social network, wherein the respective user profile includes at least one criterion for establishing random one-on-one voice communications;
  - receive, from the first and second users, authorization to engage in random one-on-one voice communications;
  - receive a request to engage in random one-on-one voice communications from at least one of the first and second users;
  - mask the voice of the first or the second user in response to user input received from the first or the second user;
  - directly connect, in response to receiving the request, the first user to the second user randomly for one-on-one voice communications, wherein:
    - the first user is randomly matched to the second user based on their respective user profiles,
    - the first user does not select the second user, and
    - the secure connection to the first and second VoIP phones is removed and from the routing path and a direct connection is established over the communications network between the first and second VoIP phones; and
  - withhold caller identification information of the first user form the second user while the first and second users are directly connected.

15. The apparatus according to claim 14, wherein the at least one criterion includes one or more of a topic of conversation, interests, region, language, or user information.

16. The apparatus according to claim 14, wherein the set of instructions further includes instructions to link the first user to one of a plurality of connection rooms based on the first user's respective user profile and prevent caller identification information from being viewed in the connection room.

17. The apparatus according to claim 14, wherein the first user is directly connected to the second user only when the second user accepts an invitation for random one-on-one voice communications with the first user.

* * * * *